United States Patent
Ellmann et al.

[11] Patent Number: 5,546,070
[45] Date of Patent: Aug. 13, 1996

[54] DEVICE FOR MONITORING THE AIR PRESSURE OF A TIRE IN MOTOR VEHICLES WITH A SENSOR

[75] Inventors: Manfred Ellmann, Buch am Erlbach; Hans-Rudolf Hein, Groebenzell, both of Germany

[73] Assignee: Bayerische Motoren Werke AG, Munich, Germany

[21] Appl. No.: 300,317

[22] Filed: Sep. 2, 1994

[30] Foreign Application Priority Data

Sep. 2, 1993 [DE] Germany ............... 43 29 591.6

[51] Int. Cl.⁶ ................................. B60C 23/00
[52] U.S. Cl. ............... 340/442; 340/443; 340/447; 73/146.5
[58] Field of Search ..................... 340/442, 443, 340/445, 447; 73/146.5

[56] References Cited

U.S. PATENT DOCUMENTS

| | | | |
|---|---|---|---|
| 4,210,898 | 7/1980 | Betts | 340/443 |
| 4,220,907 | 9/1980 | Pappas et al. | 322/3 |
| 4,862,486 | 8/1989 | Wing et al. | 377/16 |
| 5,274,355 | 12/1993 | Galan | 340/445 |

FOREIGN PATENT DOCUMENTS

| | | |
|---|---|---|
| 0197813 | 10/1986 | European Pat. Off. . |
| 3916176 | 11/1990 | Germany . |
| 3016337 | 12/1991 | Germany . |

OTHER PUBLICATIONS

*Technische Rundschau* entitled "Muskeln der Elektronik—Piezopower" by Von Daniel J. Jendritza und Hartmut Janocha, Heft 41, 1992, pp. 38–44.

Primary Examiner—Brent A. Swarthout
Assistant Examiner—Daryl C. Pope
Attorney, Agent, or Firm—Evenson, McKeown, Edwards & Lenahan, P.L.L.C.

[57] ABSTRACT

In a device for monitoring tire air pressure in motor vehicles with a sensor that delivers a signal corresponding to the deformation of the tire, and with an evaluating unit that detects the signal from the sensor, the sensor is so designed such that it delivers an electrical pulse corresponding to the degree of deformation of a tire, especially deformation during a footprint pass. The evaluating unit determines the degree of deformation as a function of the height of the amplitude of the pulse or the evaluating unit determines the degree of deformation as a function of the ratio of the duration of the pulse to the duration of one wheel revolution.

20 Claims, 1 Drawing Sheet

DEVICE FOR MONITORING THE AIR PRESSURE OF A TIRE IN MOTOR VEHICLES WITH A SENSOR

BACKGROUND AND SUMMARY OF THE INVENTION

The invention relates to a device for monitoring the air pressure of a tire in motor vehicles using a sensor and an evaluation unit. The sensor delivers a signal corresponding to the deformation of the tire. The evaluation unit receives the signal from the sensor.

A device of this kind for monitoring tire air pressure is known, for example, from German Patent document DE-39 16 176 A1. In the known device, a space-measuring device is mounted as an evaluation unit on the rim of a vehicle tire. This space-measuring device contains a transmitter which emits laser beams into the interior of the tire tread rubber (which acts as a diffuser-reflector). The laser beams reflected from the interior of the tire are received by a receiver that, in this case, functions as a sensor to deliver a signal that corresponds to the deformation of the tire. The deviation of the directions of the reflected rays from one another are evaluated by the space-measuring device as a measured value indicating the degree of radial tire indentation, which depends upon the tire air pressure.

A device for monitoring tire air pressure is known from EP 0 197 813 B1, in which the indentation of the tire is monitored from the reflection of emitted sound waves.

It is a disadvantage in the known devices for monitoring tire air pressure in motor vehicles, that the determination of the deformation of the tire using radiation or sound waves is extremely awkward and expensive.

There is therefore needed to provide a device for monitoring tire air pressure in motor vehicles, in which, firstly, a sensor of simple design is used and, secondly, a simple but accurate evaluation of the deformation of the tire is possible.

The present invention meets these needs by providing a device for monitoring tire air pressure in motor vehicles using a sensor and an evaluation unit. The sensor delivers a signal corresponding to the deformation of the tire. The evaluating unit detects the signal from the sensor. The sensor is designed to deliver an electrical pulse corresponding to the degree of deformation of a tire during a footprint pass. A sensor, especially a bending or extension sensor for measuring the deformation of a tire during a footprint pass is designed so that it delivers an electrical pulse corresponding to the degree of this deformation. Preferably the deformation of the tire sidewall is measured during the footprint pass. The "footprint" is of the tire on the road, at the point where the tire increasingly flattens out as tire pressure falls. The pressure is measured every time the point on the tire where the sensor is located comes around to form the footprint, hence a "footprint pass".

The evaluation of an electrical pulse, for example by measuring its amplitude, its duration, or the frequency with which this pulse repeatedly appears, requires a much lower expenditure for the evaluation unit than the evaluation of a reflected optical beam or sound waves. These must first be processed to produce an electrical signal that can be evaluated. Accordingly, the device according to the present invention makes it possible to detect the deformation of a tire simpler and faster.

In an advantageous embodiment of the present invention, the evaluating unit evaluates only the height of the amplitude of the electrical pulse, in order to determine the degree of deformation. This is an especially simple way to determine the deformation of the tire when high accuracy is not a requirement. For example, the influence of vehicle speed on the deformation of the tire is disregarded in this case.

In another advantageous embodiment of the invention, the evaluating unit determines the ratio of the duration of the electrical pulse to the duration of one revolution of the wheel, and determines the degree of deformation from this ratio. This is a more precise approach to determining the deformation of the tire, for example, as a function of vehicle speed as well.

Another advantageous embodiment of the present invention delivers only one electrical pulse per revolution of the wheel. Accordingly, only one sensor need be provided per wheel.

Yet another advantageous embodiment of the present invention detects the number of pulses over the entire service life of a tire. For example, a counter can be provided in the tire or on the evaluating unit. The counter can be reset only when a tire is changed. By recording the number of pulses over the entire service life of a tire, its performance can be computed and its wear estimated. This is helpful for example when deciding whether to continue using a tire or to re-use it.

Another advantageous embodiment of the invention has the sensor mounted directly on or in a zone of the tire that is deformed during a footprint pass, advantageously with maximum force. For example, it can be mounted on or in a sidewall of the tire. This direct connection between the sensor and the measurement location permits exact determination of the deformation at this measurement location.

Another advantageous embodiment of the invention preferably makes use of a piezo element as a sensor. This is an especially simple sensing device to passively determine the bending event resulting from tire deformation.

Still yet another advantageous embodiment of the present invention transmits the electrical pulse delivered by the sensor without wires to the evaluating unit. Because of the fixed location of the evaluating unit outside the tire, only the sensor and a transmitter for wireless transmission need be provided in the tire itself. The susceptibility of the evaluating unit to interference is reduced by its fixed location outside the tire, and only the least expensive components are integrated into the tire.

In another advantageous embodiment of the invention, the sensor is connected directly to a transmitter for wireless transmission of the pulse. The sensor and the transmitter are therefore mountable as an integrated component on or in the tire, thereby taking up only a little space.

In yet another advantageous embodiment of the invention, the piezo element is used not only as a sensor but also to supply electricity to the transmitter. For example, an electrical battery can be connected with the piezo element, and charged by the electrons released by the piezo element during every bending event or after a certain number of bending events.

Other objects, advantages and novel features of the present invention will become apparent from the following detailed description of the invention when considered in conjunction with the accompanying drawings.

DETAILED DESCRIPTION OF THE DRAWINGS

Figure 1:
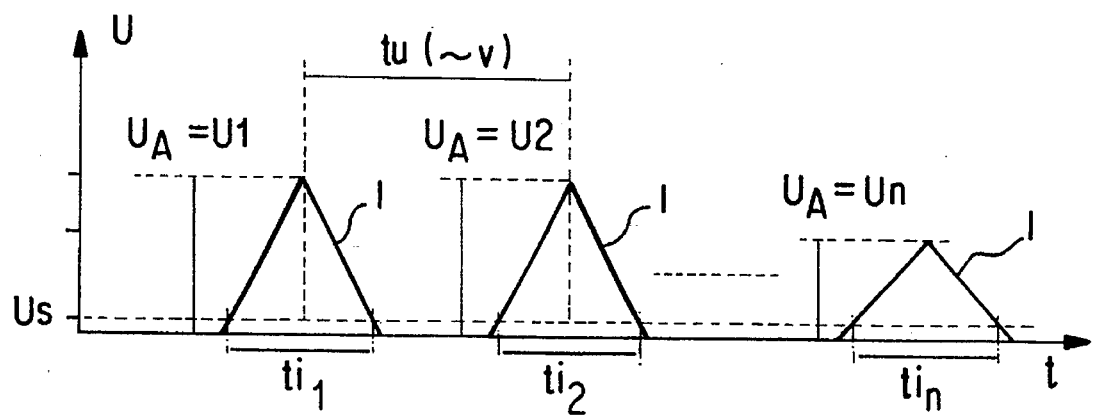
FIG. 1 is a schematic diagram of the electric pulses delivered by a sensor according to the present invention.

FIG. 1 is a schematic diagram of a train of electrical pulses I delivered by a sensor, not shown here. In the drawing, time t is plotted on the abscissa and the amplitude is plotted on the ordinate in the form of a voltage U. In this example, one pulse is generated per revolution of the wheel. The time between two pulses I or the time of one wheel revolution is the duration tu which depends upon the vehicle speed v. Each electrical pulse is primarily defined by its maximum amplitude $U_A$ and its duration ti ($ti_1$, $ti_2$, ... $ti_n$). Duration ti is determined, for example, by the time t within which pulse I has an amplitude U that is greater than a voltage threshold $U_a$. The shape of an electrical pulse I corresponding to the deformation of the tire per wheel revolution is characterized primarily by a flank that initially rises up to maximum amplitude $U_A$ with a finite steepness and then drops off again with the same slope.

First, the air pressure in a tire can be determined exclusively as a function of the maximum amplitude $U_A$ of an electrical pulse I. For this purpose, for example, tables are provided in the evaluating unit which assign to each possible maximum amplitude $U_A$ (U1, U2, ... Un) a corresponding deformation of the tire and to the latter in turn, a corresponding air pressure in the tire. If the air pressure in the tire must be determined very accurately, simple evaluation of amplitude is not sufficient, since the amplitude changes not only as a function of the air pressure but also for example as a function of the vehicle speed and/or the vehicle load. Therefore, the air pressure can also be assigned to an amplitude $U_A$, for example, as a function of the vehicle speed v and/or vehicle load. For example, different amplitude-air pressure assignment tables can be provided for different vehicle speed ranges. However, the air pressure can also be determined simultaneously as a function of the maximum amplitude $U_A$ of electrical pulse I and as a function of the duration tu of one wheel revolution, which is proportional to the speed of the vehicle v. This is also possible, for example, in the form of tables or in the form of characteristic curves, characteristic fields, or mathematical formulae.

An especially accurate value for determining air pressure by evaluating the electrical pulse corresponding to the deformation of the tire is the ratio of the duration tu of one wheel revolution to the duration ti of a pulse I. The duration ti of an electrical pulse I, especially when vehicle speed v remains constant, increases inversely with the air pressure in the tire. This is since the lower the air pressure in the tire, the more it deforms. This relationship and the influence of vehicle speed v on the duration ti of pulse I is taken into account in creating the ratio of duration tu to duration ti. For example, with a constant duration tu, i.e. with constant vehicle speed v, the tire air pressure decreases as duration ti increases.

The assignment of an amplitude, optionally also in conjunction with vehicle speed v or duration tu of one wheel revolution, to a specific value of a tire air pressure and/or the assignment of the ratio of duration tu to duration ti to a certain value of tire air pressure is usually determined empirically and stored in the form of tables or characteristic fields in the evaluating unit.

Figure 2:
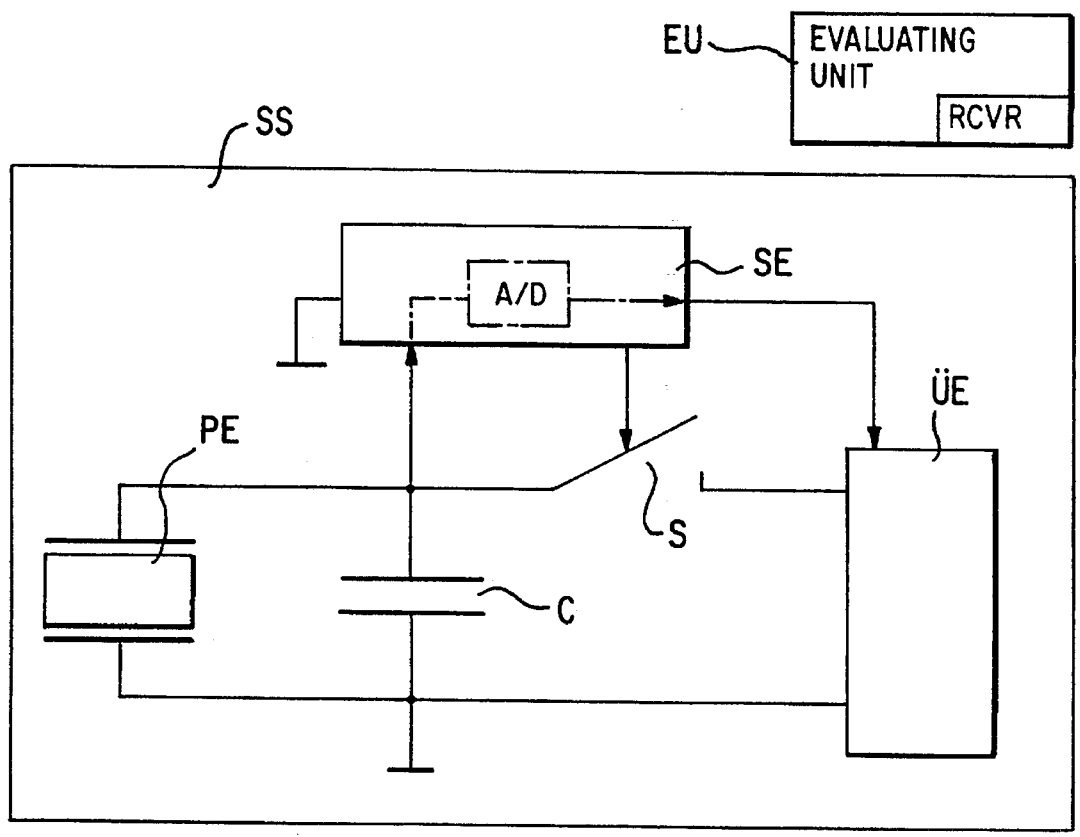
FIG. 2 shows a sensor circuit with a piezo element.

FIG. 2 shows a sensor circuit SS incorporated, for example, into the sidewall of a tire. Sensor circuit SS contains a piezo element PE as a sensor, a control unit SE with an analog/digital converter A/D, a transmission unit UE as a transmitter, a controllable switch S, and a capacitor C as an electrical memory. The receiver associated with transmission unit UE is located in an evaluating unit EU, permanently mounted on the motor vehicle. Signals are transmitted wirelessly between transmission unit UE and the receiver of the evaluating unit.

Sensor PE is connected as a piezo element in parallel with capacitor C as an electrical memory. Sensor PE is connected with one input of control unit SE. A first output of control unit SE leads to controllable switch S. Another output of control unit SE is connected to transmission unit UE. Controllable switch S is located between capacitor C and transmission unit UE.

Piezo element PE generates an electrical pulse I with each revolution. The pulse is guided through the input of control unit SE to an A/D converter. The analog/digital-converted electrical voltage pulse is transmitted, for example, in the form of a code at the second output of the control device SE to the transmission unit UE. If transmission unit UE is supplied with voltage, the electrical pulse I, for example, in the form of a digital code, is transmitted to the receiver of the evaluating unit EU. Capacitor C serves as a power supply for transmission unit UE when controllable switch S is closed. Capacitor C is charged by the charges delivered by piezo element PE, with control unit SE for example determining the voltage of capacitor C from the number of pulses I already given and closing control switch S through the first output when the charge on capacitor C has reached a minimum voltage value. As long as sufficient voltage is available from capacitor C to supply transmission unit UE, each electrical pulse I delivered by piezo element PE with each wheel revolution will be transmitted, preferably in digital form, by transmission unit UE to the evaluating unit. However it is also possible to transmit electrical pulse I, delivered by piezo element PE, from transmission unit UE in analog form to the evaluating unit. Transmissions in digital form are more accurate and reliable than those in analog form, however, as experience shows.

It is also possible however to convert the pulse I delivered by piezo element PE and corresponding directly to the deformation of the tire in control unit SE into a square-wave pulse. The square wave pulse has an amplitude which corresponds to the maximum amplitude of the original pulse. Hence, a transmission in analog form would be less prone to interference and analog-digital conversion would be unnecessary.

Use of a piezo element PE simultaneously as a sensor and as an energy source for capacitor C to supply transmission unit UE makes it unnecessary to have an additional source of power, which would either have to be transmitted externally over a cable or through another transmission unit or would have to be integrated in the form of a battery into the sensor circuit.

However, it is also possible according to the invention to provide a piezo element solely as a source of power for the transmitter, the control unit, and/or the sensor and, for example, to provide an additional piezo element, a strain gauge or a thermo element as a sensor.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for monitoring a tire air pressure in a tire on a motor vehicle, comprising:

a sensor operatively arranged with respect to the tire for delivering a signal corresponding to a deformation of the tire;

an evaluating unit arranged in the motor vehicle for receiving said signal from the sensor;

wherein said sensor delivers an electrical pulse corresponding to a degree of the deformation of a tire during a footprint pass;

wherein the evaluating unit continuously determines various degrees of deformation as a function of said electrical pulse.

2. A device according to claim 1, wherein the evaluating unit determines said degree of the deformation as a function of an amplitude height of said electrical pulse.

3. A device according to claim 1, wherein said evaluating unit determines said degree of the deformation as a function of a ratio of a duration of the electrical pulse to a duration of one wheel revolution of said tire.

4. A device according to claim 1, wherein said electrical pulse is delivered per wheel revolution of the tire.

5. A device according to claim 2, wherein one electrical pulse is delivered per wheel revolution of the tire.

6. A device according to claim 3, wherein one electrical pulse is delivered per wheel revolution of the tire.

7. A device according to claim 4, wherein a number of pulses is determined over a service life of the tire.

8. A device according to claim 1, wherein said sensor is mounted on or in an area of the tire that is deformed during said footprint pass.

9. A device according to claim 2, wherein said sensor is mounted on or in an area of the tire that is deformed during said footprint pass.

10. A device according to claim 3, wherein said sensor is mounted on or in an area of the tire that is deformed during said footprint pass.

11. A device according to claim 1, wherein said sensor is a piezo element.

12. A device according to claim 2, wherein said sensor is a piezo element.

13. A device according to claim 3, wherein said sensor is a piezo element.

14. A device according claim 1, wherein said evaluating unit is permanently mounted in the motor vehicle and further comprising means for wirelessly transmitting the electrical pulse to said evaluating unit.

15. A device according claim 11, wherein said evaluating unit is permanently mounted in the motor vehicle and further comprising means for wirelessly transmitting the electrical pulse to said evaluating unit.

16. A device according to claim 1, wherein said sensor is connected to a transmitter for wireless transmission of the electrical pulse.

17. A device according to claim 11, wherein said sensor is connected to a transmitter for wireless transmission of the electrical pulse.

18. A device according to claim 1, wherein said sensor includes a piezo element and a transmitter, said piezo element being coupled with said transmitter to supply electricity thereto.

19. A device according to claim 2, wherein said sensor includes a piezo element and a transmitter, said piezo element being coupled with said transmitter to supply electricity thereto.

20. A device according to claim 3, wherein said sensor includes a piezo element and a transmitter, said piezo element being coupled with said transmitter to supply electricity thereto.

* * * * *